United States Patent [19]

Ott

[11] 4,432,391

[45] Feb. 21, 1984

[54] IMPULSE VALVE

[75] Inventor: Helmut Ott, Stuttgart, Fed. Rep. of Germany

[73] Assignee: Herion-Werke KG, Fellbach, Fed. Rep. of Germany

[21] Appl. No.: 296,185

[22] Filed: Aug. 25, 1981

[30] Foreign Application Priority Data

Oct. 14, 1980 [DE] Fed. Rep. of Germany ........ 3038802

[51] Int. Cl.³ .......................................... F15B 13/043
[52] U.S. Cl. ............................ 137/625.64; 137/625.6
[58] Field of Search ........................ 137/625.6, 625.64

[56] References Cited

U.S. PATENT DOCUMENTS 2,981,287  4/1961  Caslow .................... 137/625.64 X
3,805,837  4/1974  Stampfli .................... 137/625.6

FOREIGN PATENT DOCUMENTS 1165955  3/1964  Fed. Rep. of Germany ..................... 137/625.64
2813030  9/1979  Fed. Rep. of Germany ..................... 137/625.64

Primary Examiner—Gerald A. Michalsky
Attorney, Agent, or Firm—Michael J. Striker

[57] ABSTRACT

An impulse valve has a housing provided with a working chamber and a main piston movable in the working chamber; two preliminary control valves are electromagnetically operated for a short period to switch over the main piston into a selected switching position which is retained even if the preliminary control valve is deenergized. To reduce volume of the valve and to reduce manufacturing cost, a flexible diaphragm is arranged between the preliminary control valves and the main control valve and cooperates with two opposite valve seats in such a manner as to establish connection between an inlet port to the working chamber and alternatively to pressure-relieve the working chamber.

10 Claims, 4 Drawing Figures

IMPULSE VALVE

BACKGROUND OF THE INVENTION

The present invention relates in general to an impulse valve and in particular to an impulse valve having two electromagnetically operated preliminary control valves, a housing with a control piston which is shiftable in a working chamber and cooperating with the preliminary control valves in such a manner that is adjusted position remains unchanged even if the preliminary control valves are inactivated, and the housing further defining an inlet port, a pressure-relieving port and two working ports, for example.

In an impulse valve only a short electrical impulse is applied to the selected preliminary control valves in order to switch over a control position of the main piston; the switching movement is effected in a very short time interval and the main piston, after being shifted from one control position into another one, retains the changed position even after the control impulse is terminated, that is, even after the corresponding preliminary control valve is deactivated. This condition is repeated in each changeover of the control position of the main valve.

In this manner it is achieved that during the time interval in which the main control valve is adjusted in one or the other control position, no energy is to be applied to the preliminary control valve, and consequently the energy for activating the solenoids is saved.

Known embodiments of multi-way impulse valves have voluminous constructions and are expensive in manufacture.

SUMMARY OF THE INVENTION

It is therefore a general object of the present invention to overcome the aforementioned disadvantages.

More particularly, it is an object of the invention to provide an impulse valve which is not possessed of these disadvantages.

An additional object of the invention is to provide such an improved impulse valve which requires a less voluminous construction and which is also simpler in design.

In keeping with these objects and others which will become apparent hereafter, one feature of the invention resides, in an impulse valve of the aforedescribed type, in the provision of valving element such as for example a flexible diaphragm, arranged between the preliminary control valves and the working chamber for the main piston, by means of which the connection from the inlet port to the working chamber, on the one hand, and the pressure relief of the working chamber is controllable and the diaphragm being permanently biased by a pressure which is applied via a control channel from one of the working ports.

In the preferred embodiment of this invention, two valve seats are provided in the housing in connection with the valve member, one valve seat being provided opposite the sides of the diaphragm at which the communication between the inlet port and the working chamber is established, and the other ports being provided in a connection between a pressure-relieving port and the working chamber.

The diaphragm is arranged in such a manner that it is acted upon by the inlet pressure fluid when one of the preliminary control valves is activated and is pressure relieved when the other preliminary control valve is energized.

With advantage, the housing between the two valve seats of the valve member is formed with an annular chamber which is connected permanently via the control channel to one of the working ports. With advantage, a throttle or restrictor is built into the control channel, and one of the working ports is connected directly and the other working port is connected via the main piston to the pressure-relieving port.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
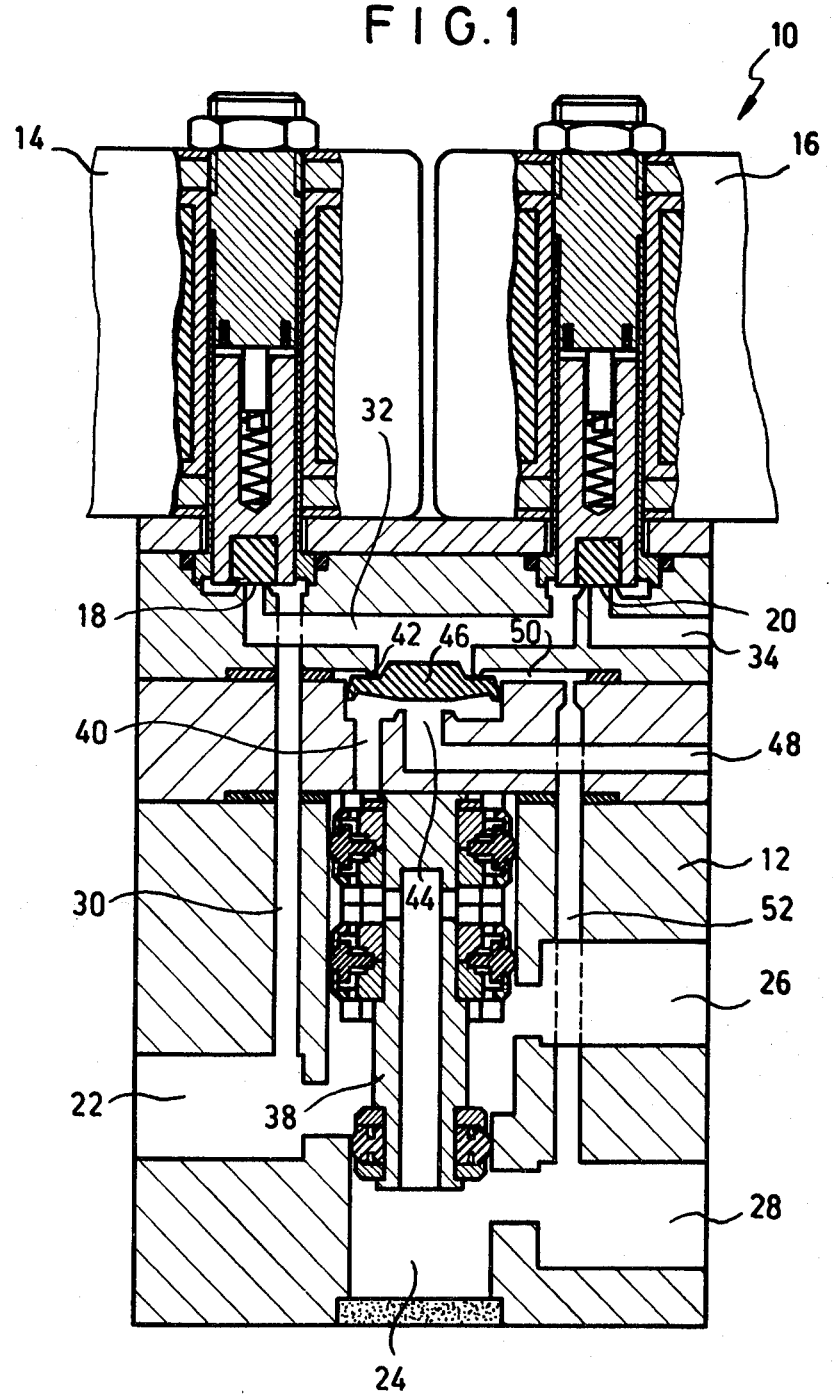
FIGS. 1-4 show schematically in a sectional side view the impulse valve according to this invention in different switching positions.

In the Figures, an impulse valve 10 has a housing 14 which is operatively connected with two electromagnetically operated preliminary control valves 14 and 16. The preliminary control valve 14 has an armature 72 which is normally pressed by a biasing spring against a valve seat 18 and the other preliminary control valve 16 has an armature 74 which is spring-biased against another valve seat 20 formed in the housing 14. The housing is further provided with an inlet port 22, a return or pressure relief port 24, and with two working ports 26 and 28 which lead to two different consumers.

The inlet port 22 communicates via a branch conduit 30 with the preliminary control valve 14 and the valve seat 18 of the valve 14 is connected by a connection conduit 32 to the second preliminary control valve 16. The valve seat 20 of the control valve 16 is in connection with a pressure-relieving channel 34.

Housing 14 is also formed with a working chamber 36 in which a main piston 38 is guided for movement between two contrl positions; piston 38 has a step-like cross section provided with three piston areas 56, 58 and a smaller piston area 60.

Between the connecting conduit or channel 32 and the working chamber 36 a bore 40 is formed defining a first valve seat 42 and a second valve seat 44. A valve element 46, in this example a flexible diaphragm, is arranged for movement between the two valve seats 42 and 44 in such a manner that, when one valve seat is open the other is closed, and vice versa. The second valve seat 44 is in connection with a pressure-relieving channel 48.

In the region between the valve seats 42 and 44 an annular chamber 50 is formed in the housing and communicates permanently via a control channel 52 with the working port 28. The control channel 52 is formed with a restrictor or throttle 64.

The lower face of main piston 38 is formed with a blind bore 64 extending in axial direction and communicating with a transverse bore 62 having in the region between piston areas 56 and 58 into the other working port 26 so that the latter is pressure-relieved therethrough.

The lower part of valve element 46 is extended in diameter to cover the connecting bore 40 and is provided with a downwardly directed lip 66 which due to the flexibility of diaphragm 46 controls the closing or opening of the bore 40.

The operation of the impulse valve of this invention is as follows:

In the position as illustrated in FIG. 1, both preliminary control valves 14 and 16 are deenergized and their respective armatures 72 and 74 rest on the corresponding valve seats 18 and 20 so that the latter are closed. The part of working chamber 36 above the main valve 38 or above its uppermost piston area 56 is pressure-relieved via the connecting bore 40, the open valve seat 44 and the pressure-relieving channel 48. Due to the larger cross-sectional area of piston part 58 relative to the lower piston part 60, pressure medium from the inlet port 22 retains the main piston 38 in the position as illustrated in FIG. 1. In this position the working port 26 is connected with the intake port 22, whereas the other working port 28 communicates with the pressure-relieving port 24.

Figure 2:
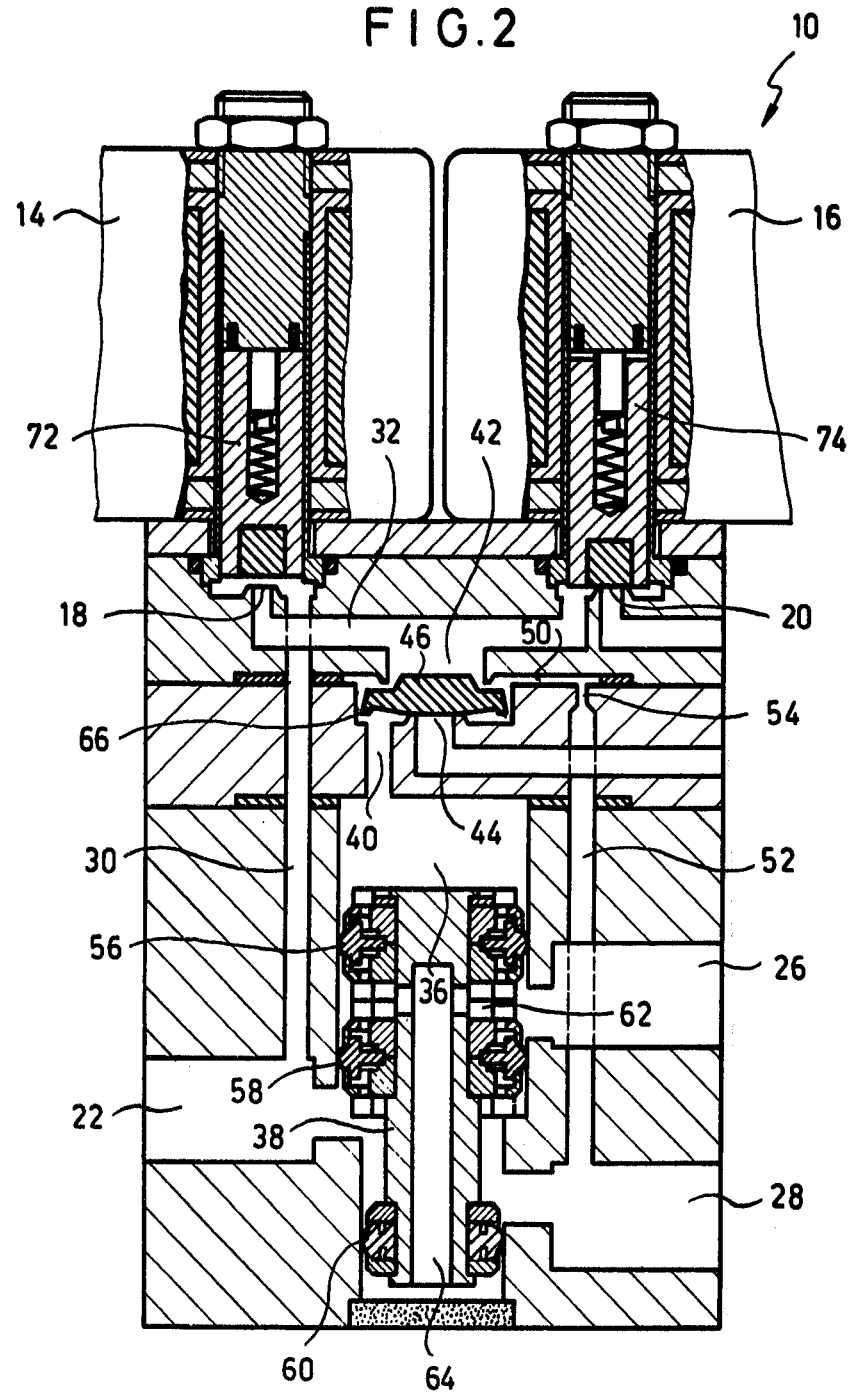

In the position as illustrated in FIG. 2, the preliminary control valve 14 is activated and its armature 72 disengages valve seat 18 and opens the passage for the pressure medium, such as pressure air for example, flowing from inlet port 22, branch conduit 30, the open valve seat 18 and the connection channel 32 against the diaphragm 46. Due to the pressure acting against the diaphragm 46, the latter is displaced in axial direction downwardly against the valve seat 44 so that the valve seat 42 is opened and the valve seat 44 is closed. As a consequence, pressure medium flows through the open valve seat 42 past the outer rim 66 which is bent downwardly and opens the connecting bore 40 so that the pressure medium can enter the working chamber 36. Inasmuch as the second valve seat 44 is closed by the diaphragm 46, the connection between the working chamber 36 and the pressure-relieving channel 48 is interrupted. The resulting pressure difference causes the main valve 38 to move downwardly into the position illustrated in FIG. 2. In the latter control position the connection between the inlet port 22 to the working port 28 is established whereas the other working port 26 is pressure-relieved via the transverse bore 62 and the axial bore 64.

Figure 3:
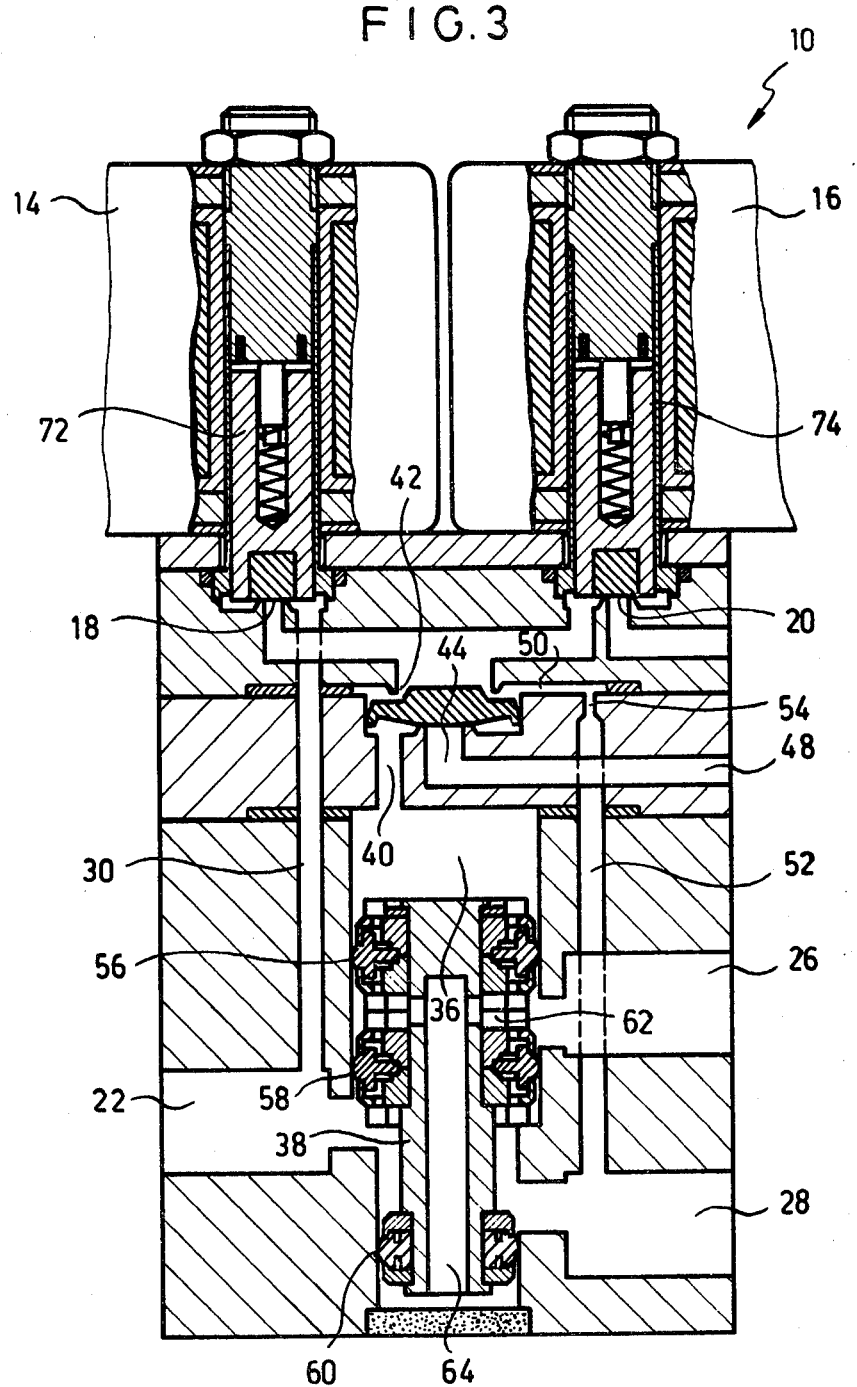

In the position illustrated in FIG. 3, the first preliminary control valve 14 is again deenergized or disconnected so that its armature 72, due to the biasing spring, is pressed again against the valve seat 18 and closes the same. The connection from the inlet port 22 to the connecting conduit 32 is thus closed. The diaphragm 46 nonetheless remains in the same position as shown in FIG. 2, that is, its valve seat 42 remains open and its valve seat 44 remains closed, because pressure medium from the working port 28 continues to act upon the upper side of the diaphragm 46 via the control channel 52 and the annular chamber 15. This position of the diaphragm is maintained even if the pressure medium flows around the circumference of the diaphragm, that is, around its downwardly directed lip 66, inasmuch as the upper surface of the diaphragm exceeds the effective lower surface thereof and the central lower area above the valve seat 44 is pressure-relieved. The switching position of main valve 38 is thus preserved even when the preliminary control valve 14 is disconnected.

Figure 4:
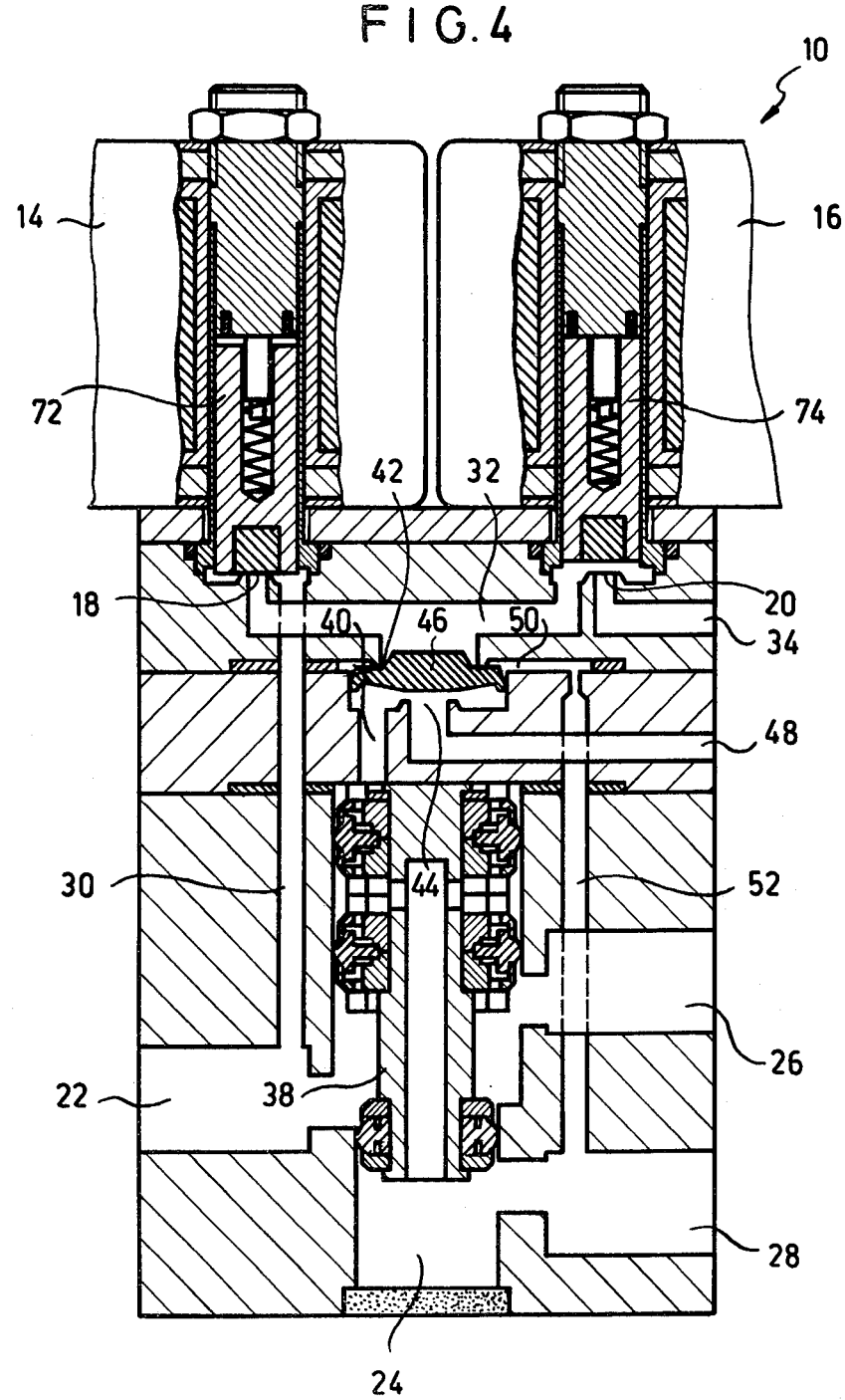

In the switching position illustrated in FIG. 4, the other preliminary control valve 16 is activated and its armature 74 is displaced against the biasing spring away from the valve seat 20 so that the latter is opened. The connecting channel 32 is therefore pressure-relieved via the open valve seat 20 and the channel 34.

Pressure medium present in the working chamber 36 starts displacing the diaphragm upwardly until its valve seat 42 is closed and the lower valve seat 44 is opened. Working chamber 36 thus becomes pressure-relieved through the connecting bore 40 and the open valve 44 and the pressure-relieving channel 48. The main piston 38, due to the resulting pressure difference and due to different piston areas 58 and 60, is moved upwardly into the position illustrated in FIG. 4, in which working port 26 is reconnected to the inlet port 22 and the other working port 28 is pressure-relieved through the pressure-relieving port 24.

As soon as the other preliminary control valve 16 is again deenergized, its armature 74 is displaced by its biasing spring against the valve seat 20 so that the latter is closed and the impulse valve attains its original position illustrated in FIG. 1. In this original position, the working chamber 36 is pressure-relieved via the connecting bore 40, the open valve seat 44 and the pressure-relieving channel 48, and the main valve piston 38 remains in the illustrated position until the preliminary control valve 14 is reactivated.

The throttle 54 in the control channel 52 serves for ensuring a reliable switchover of the main piston. The cross section of the throttle 54 is adjusted to the cross section of the valve seat 20, but is smaller than the latter, so that in opening the valve seat 20 (during the switchover from the position of FIG. 3 into the position of FIG. 4) more pressure air exits through the valve seat 20 than is supplied through the throttle 54.

Similarly, the throttle 54 is adjusted to the cross section of the valve seat 18 and is also smaller than the latter. Consequently, in opening the valve seat 18 (during the switchover from the position of FIG. 1 to the position of FIG. 2) more pressure air flows into the connection channel 32 through the open valve seat 42 than is relieved through the throttle 54 into the working port 28.

It will be understood that each of the elements described above, or two or more together, may also find a useful application in other types of constructions differing from the types described above.

While the invention has been illustrated and described as embodied in an impulse valve having a flexible diaphragm as a valving element between the preliminary control valve and the main piston, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An impulse valve having a housing formed with an inlet port for a pressure medium, a pressure-release port, two pressure relieving channels, at least two working ports and a working chamber; a main piston movable in the chamber between predetermined switching positions; two solenoid-operated preliminary control valves each having a valve seat interconnected by a connection channel; one preliminary control valve controlling communication between the connecting channel and said inlet port and the other preliminary control valve controlling communication between the connecting channel and one of the pressure-relieving channels; a valve member arranged between the connection channel and said working chamber and being movable into a first position in which the working chamber is connected to the other pressure-relieving channel and a second position in which the working chamber is connected to the inlet port; and a control channel permanently connecting one of said working ports with said valve member to bias the same by pressure in the one working port towards said second position of the valve member, whereby said main piston remains in a switching position adjusted by said preliminary control valves even when the latter are inactivated.

2. An impulse valve as defined in claim 1; further including a branch conduit communicating with said inlet port and connecting said inlet port to the valve seat of said one preliminary control valve; and said one pressure-relieving channel communicating with the valve seat of said other preliminary control valve.

3. An impulse valve as defined in claim 2; further including a first valve seat cooperating with said valve member in said first position thereof and a second valve seat cooperating with said valve member in the second position thereof and said other pressure-relieving channel cooperating with said second valve seat.

4. An impulse valve as defined in claim 3, wherein said valve member is a flexible diaphragm having a larger surface area cooperating with said second valve seat and a smaller surface area cooperating with said first valve seat, whereby said smaller surface area is acted upon by the inlet pressure medium via said one preliminary control valve and being pressure-relieved via said one pressure-relieving channel via said other preliminary control valve.

5. An impulse valve as defined in claim 4; further including an annular chamber arranged between the first and second control valves, said diaphragm having a rim portion extending into said annular chamber, and said permanently connected control channel opening into said annular chamber.

6. An impulse valve as defined in claim 1, wherein a throttle is built in said control channel.

7. An impulse valve as defined in claim 1, wherein one of said working ports is connected directly to the pressure-relieving port and the other working port is connected to the pressure-relieving port through said main piston.

8. An impulse valve as defined in claim 7, wherein said main piston has an axial blind bore opening into said pressure relieving port, and transverse passages connecting said blind bore to said other working port.

9. An impulse valve as defined in claim 1, wherein said main piston has a stepped configuration defining two piston areas of larger cross section and one piston area of smaller cross section.

10. An impulse valve having a housing formed with an inlet port for a pressure medium, a pressure-release port, a pressure relieving channel, at least two working ports and a working chamber; a main piston movable in the chamber between predetermined switching positions; a solenoid-operated preliminary control valve having a valve seat connected to a connection channel; said preliminary control valve controlling communication between the connecting channel and said inlet port; a valve member arranged between the connection channel and said working chamber and being movable into a first position in which the working chamber is connected to the pressure-relieving channel and a second position in which the working chamber is connected to the inlet port; and a control channel permanently connecting one of said working ports with said valve member to bias the same by pressure in the one working port towards said second position of the valve member, whereby said main piston remains in a switching position adjusted by said preliminary control valve even when the latter is inactivated.

* * * * *